(12) United States Patent
Freienstein et al.

(10) Patent No.: US 10,723,010 B2
(45) Date of Patent: Jul. 28, 2020

(54) HAND-HELD POWER TOOL, IN PARTICULAR ELECTRIC HAND TOOL

(71) Applicant: Robert Bosch GmbH, Stuttgart (DE)

(72) Inventors: Heiko Freienstein, Weil der Stadt (DE); Benjamin Visel, Bad Liebenzell-Moettlingen (DE); Christoph Steurer, Urbach (DE); Joerg Moennich, Stuttgart (DE); Tobias Herr, Stuttgart (DE); Anja Koenig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/739,051

(22) PCT Filed: May 12, 2016

(86) PCT No.: PCT/EP2016/060674
§ 371 (c)(1),
(2) Date: Apr. 11, 2018

(87) PCT Pub. No.: WO2016/206860
PCT Pub. Date: Dec. 29, 2016

(65) Prior Publication Data
US 2018/0319003 A1 Nov. 8, 2018

(30) Foreign Application Priority Data
Jun. 24, 2015 (DE) .......................... 10 2015 211 707

(51) Int. Cl.
*B25F 5/02* (2006.01)
*B25F 5/00* (2006.01)
(Continued)

(52) U.S. Cl.
CPC .................. *B25F 5/02* (2013.01); *B25F 5/00* (2013.01); *G06K 19/0706* (2013.01);
(Continued)

(58) Field of Classification Search
CPC ......... B25F 5/00; B25F 5/02; G06K 19/0706; G06K 19/07747; H01M 2220/30; H02J 7/0042

See application file for complete search history.

(56) References Cited

U.S. PATENT DOCUMENTS 6,456,039 B1  9/2002  Lauper et al.
7,004,848 B2 * 2/2006  Konow .................. A63B 53/04
473/223
(Continued)

FOREIGN PATENT DOCUMENTS

DE   102 38 710 A1   3/2004
EP     1 690 648 A2   8/2006
(Continued)

OTHER PUBLICATIONS

International Search Report corresponding to PCT Application No. PCT/EP2016/060674, dated Jul. 6, 2016 (German and English language document) (7 pages).

*Primary Examiner* — Steven Lim
*Assistant Examiner* — Mancil Littlejohn, Jr.
(74) *Attorney, Agent, or Firm* — Maginot, Moore & Beck LLP

(57) ABSTRACT

A hand-held power tool, in particular an electric hand tool, includes an identification module and a housing. The identification module includes a transponder having at least one data store configured to store identification information and a radio module configured to transmit the identification data. The identification module is integrated into the housing.

11 Claims, 2 Drawing Sheets

(51) Int. Cl.
*G06K 19/07* (2006.01)
*G06K 19/077* (2006.01)
*H02J 7/00* (2006.01)

(52) U.S. Cl.
CPC ... *G06K 19/07747* (2013.01); *H01M 2220/30* (2013.01); *H02J 7/0042* (2013.01)

(56) References Cited

U.S. PATENT DOCUMENTS

| | | | |
|---|---|---|---|
| 2003/0008722 A1* | 1/2003 | Konow | A63B 53/04 |
| | | | 473/223 |
| 2008/0135272 A1 | 6/2008 | Wallgren | |
| 2010/0181964 A1* | 7/2010 | Huggins | H02J 17/00 |
| | | | 320/108 |
| 2012/0062366 A1* | 3/2012 | Pappu | G06K 7/10009 |
| | | | 340/10.1 |
| 2013/0262002 A1* | 10/2013 | Braun | H04Q 9/00 |
| | | | 702/63 |
| 2014/0070924 A1 | 3/2014 | Wenger et al. | |
| 2014/0159662 A1 | 6/2014 | Furui et al. | |
| 2014/0184397 A1 | 7/2014 | Volpert | |
| 2014/0240125 A1 | 8/2014 | Burch et al. | |
| 2015/0340921 A1* | 11/2015 | Suda | H02K 7/145 |
| | | | 310/50 |

FOREIGN PATENT DOCUMENTS

| | | |
|---|---|---|
| EP | 2 581 168 A1 | 4/2013 |
| WO | 2013/136917 A1 | 9/2013 |

\* cited by examiner

HAND-HELD POWER TOOL, IN PARTICULAR ELECTRIC HAND TOOL

This application is a 35 U.S.C. § 371 National Stage Application of PCT/EP2016/060674, filed on May 12, 2016, which claims the benefit of priority to Serial No. DE 10 2015 211 707.3, filed on Jun. 24, 2015 in Germany, the disclosures of which are incorporated herein by reference in their entirety.

The disclosure relates to a hand-held power tool, in particular an electric hand-held power tool, having an identification module, which has a transponder that comprises at least one data storage for storing identification data, and comprises a radio module for transmitting the identification data.

BACKGROUND

Hand-held power tools of the type stated at the outset are known in principle from the prior art. The inventorying of mobile items, in particular hand-held power tools, is effected predominantly by manual identification marking of the respective item, for example with an inventory number or serial number, which is read off. Usually, the inventory is documented in handwriting on paper, or by means of management software. This also enables further features, such as current storage location, assigned employee, test cycle, usage time or the like to be assigned to the respective item.

In order to simplify inventorying, it is also already known to apply to such items, in particular to hand-held power tools, an identification module that communicates wirelessly with a base station. For this purpose the identification module has a transponder, which comprises at least one data storage, for storing identification data, and a radio module, for transmitting the identification data. When the transponder is activated, in particular via radio communication, the identification stored in the data storage is transmitted, or sent back to the base station, by the transponder for the purpose of identifying it. The base station logs the data and routes them, for example, to a central server, where, for example, they are verified or updated.

SUMMARY

The hand-held power tool according to the disclosure has the advantage that the identification module is realized as a fixed component of the hand-held power tool. For this purpose, it is provided according to the disclosure that the identification module is arranged such that it is integrated into a housing of the hand-held power tool. Consequently, the identification module need no longer be retroactively attached to the outside of the hand-held power tool, where it is exposed to dirtying and stresses. As a result of being arranged such that it is integrated in the housing of the hand-held power tool, it is protected, and can be supplied already with the hand-held power tool. In particular, it is provided that the identification module, as a fixed component of the hand-held power tool, has a rewritable data storage such that, at a subsequent point in time, after the hand-held power tool has been assembled, the identification data of the hand-held power tool can be written into the identification module, or into its data storage. Expediently, for this purpose the radio module, in addition to having a transmitting unit, also has a receiving unit for wirelessly receiving the identification data to be stored. Alternatively, it may be provided that the identification module can be contacted in a wired manner, in particular to enable initial writing, or setting-up, of the data storage during or after assembly.

According to a preferred development of the disclosure, it is provided that the housing has a receiver, in which the identification module is arranged. The receiver enables the identification module to be securely fastened in the housing. In particular, it provided that the identification module can be arranged at least substantially without play in the receiver, such that, when the hand-held power tool is in operation, no rattling sounds or the like are produced. In particular, it is provided that the identification module is held in the receiver with the interposition of at least one damping element that is realized so as to be elastically deformable.

Particularly preferably, it is provided that the identification module is arranged in a replaceable manner in the receiver. The identification module can thus be removed completely from the housing of the hand-held power tool and, for example, replaced by another identification module. As a result, for example, particularly if the data storage cannot be overwritten, the identify of the hand-held power tool can be changed or updated by replacement of the identification module.

According to a preferred development of the disclosure, it is provided that the identification module is electrically connected, or can be electrically connected, to an energy storage device of the hand-held power tool. The electrical energy necessary for operating the identification module is thus provided by the energy storage device of the hand-held power tool, which in particular is realized as an electric hand-held power tool. This ensures a simple power supply to the identification module.

According to a preferred development of the disclosure, it is provided that the identification module has its own energy storage device. The identification module's own energy storage device, which to that extent is independent of an energy storage device of the hand-held power tool, provides electrical energy solely for the identification module. As a result, in particular, the service life of the identification module's own energy storage device, or of the identification module, can be increased, operation of the identification module then also being no longer dependent on the operation of the hand-held power tool. It can thereby also be ensured, in particular, that inventorying of the hand-held power tool is possible even if the energy of the energy storage device of the hand-held power tool is exhausted.

According to a preferred development of the disclosure, it is additionally provided that the identification module's own energy storage device is realized so as to be replaceable. For this purpose, the identification module's own energy storage device has, for example, plug-in or touch contacts that, upon being inserted in the identification module, can be brought automatically into electrical contact with corresponding counter-contacts of the identification module. Long-term operation of the identification module can thus easily be ensured by replacement of the energy storage device.

It is furthermore preferably provided that the housing of the hand-held power tool has a cover that closes or uncovers a replacement opening assigned to the identification module's own energy storage device. The cover enables the housing to be closed, such that the identification module is reliably protected inside the housing of the hand-held power tool. If the cover is removed or opened, the identification module's own energy storage device can easily be removed from the housing and replaced, for example, by a new, charged energy storage device. In particular, for this purpose the cover is held in a pivotable, displaceable or detachable manner on the housing of the hand-held power tool. For example, the cover, together with the housing, may form a screw-type joint or bayonet joint.

According to a preferred development of the disclosure, it is furthermore provided that the identification module is coupled in a wired manner or wirelessly to a control device of the hand-held power tool. Information can thereby be exchanged between the identification module and the control device. In particular, this enables usage data of the hand-held power tool, such as, for example, usage duration, load, fault indications or the like to be forwarded by the identification module to the already previously mentioned central unit/base station.

Preferably, it is furthermore provided that the identification module's own energy storage device is realized so as to be rechargeable, and is electrically connected, or can be electrically connected, to an energy supply of the hand-held power tool. If the hand-held power tool has its own energy storage device or a mains electric power-supply plug, the identification module's own energy storage device can be recharged by the energy provided by the electricity grid or the energy storage device of the hand-held power tool. In this case, the hand-held power tool, in particular the identification module, has a control unit that charges the identification module's own energy storage device in dependence on the energy supply of the hand-held power tool.

It is additionally preferably provided that the identification module has its own module housing. As a result, the identification module is realized in a particularly compact manner, and overall is easily mounted in the hand-held power tool, and if necessary demounted again, for example for servicing and repair purposes. In particular, the identification module's own energy storage device is also arranged in the housing, next to the transponder. Particularly preferably, the energy storage device and the transponder, or the radio module, are held on a printed circuit board arranged in the housing, and electrically connected to each other by the printed circuit board.

BRIEF DESCRIPTION OF THE DRAWINGS

The disclosure is to be explained in greater detail in the following, on the basis of the drawing. For this purpose, there are shown FIG. 1 an electric hand-held power tool, in a perspective representation, FIG. 2 a partial sectional representation of the electric hand-held power tool, and FIG. 3 an identification module of the hand-held power tool, in a simplified representation.

DETAILED DESCRIPTION

Figure 1:
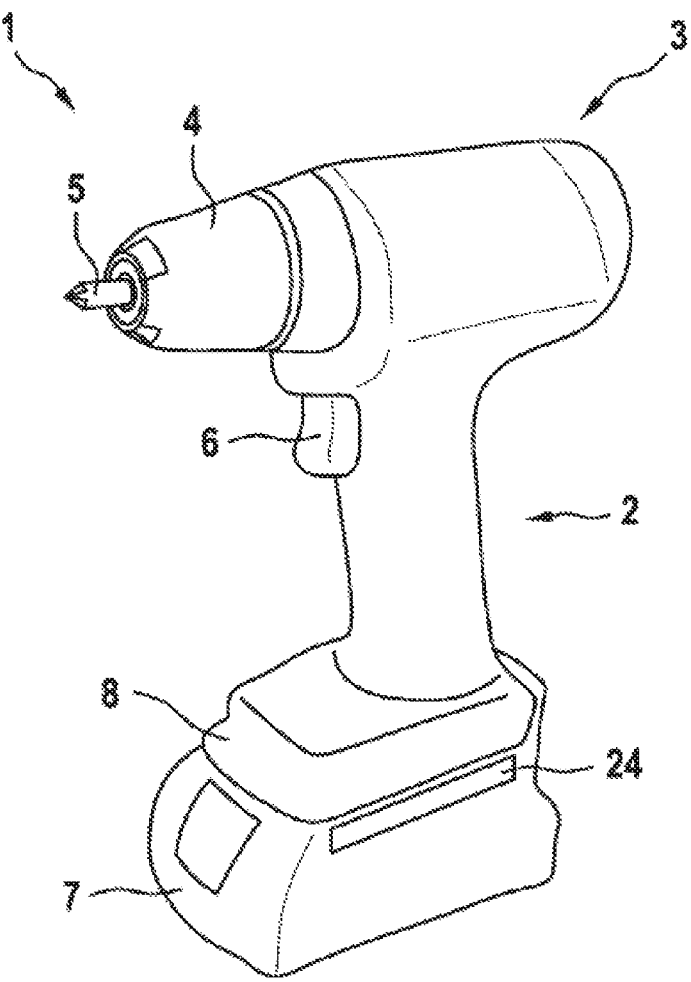

FIG. 1 shows an exemplary embodiment of an advantageous hand-held power tool 1, realized as an electric hand-held power tool. For this purpose, the hand-held power tool 1 is realized in a pistol design, having a handle part 2 and, arranged substantially perpendicular thereto, a tool part 3. Held in the tool part are an electric motor, a transmission that is operatively connected to the electric motor, and a tool holder 4 that is operatively connected to the transmission and is in the form of a chuck for a tool 5, which in the present case is realized as a screwdriver bit. Arranged in the handle part 2 are electronics 9 for operating the electric motor, and an actuating switch 6, by means of which a user can call up a torque and/or rotational speed of the electric motor. A replaceable energy storage module 7 (accumulator battery pack) is held in a detachable manner at the free end region 8 of the handle part 2.

Figure 2:
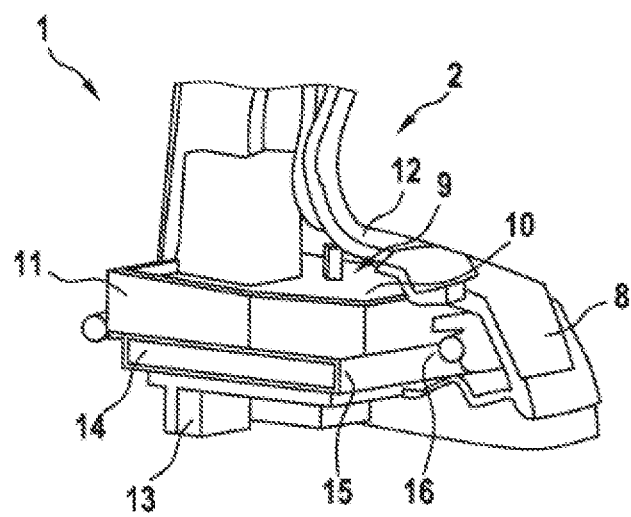

FIG. 2 shows a sectional representation through the handle part 2 in the free end region 8. Arranged in the free end region 8, as already mentioned, are the electronic 9, which comprise, for example, a microprocessor and/or an integrated circuit for selectively feeding the electrical energy, provided by the energy storage module 7, to the electric motor, such that the torque or rotational speed called up by the user is set. In the present case, the electronics 9 have a printed circuit board 10, on which electronic components such as, for example, the aforementioned microprocessor, are arranged. The printed circuit board 10 in this case is held, in a housing shell 11, in the housing 12 of the handle part 2.

Arranged beneath the housing shell 11, i.e. between the electronics 9 and an interface 13 of the housing part 2 to the energy storage module 7, is an identification module 14, which has its own housing 15. The handle part 2 has a recess 16, in which the housing 15 is held inserted. The housing 12 of the hand-held power tool 1 in this case is realized, for example, in two parts, having two housing half-shells, such that during assembly the housing 15, together with the electronics 9 and the other components of the electric hand-held power tool 1, can be inserted in one housing half, and then the second housing half is put on. It is also conceivable for one of the housing halves of the housing 12 to have an opening, through which the identification module 14 can be pushed into the housing 12. This opening can then expediently be closed by a closure element, or cover. As a result of being arranged in the housing 12, the identification module 14 is integrated into the hand-held power tool 1.

Figure 3:
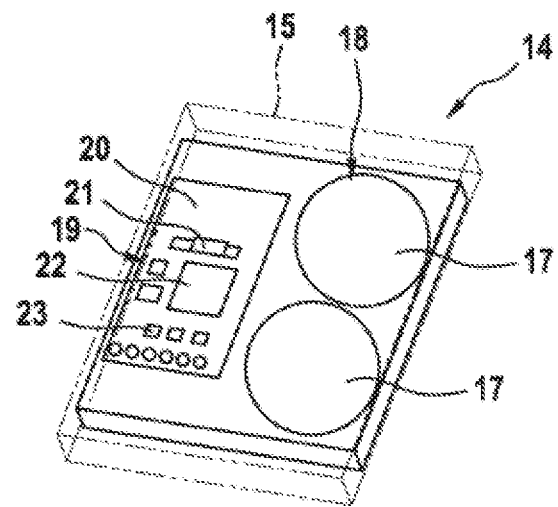

FIG. 3 shows a simplified representation of the identification module 14. The housing 15 is likewise realized in the form of a dish, and thus has a receiving cavity, in which components of the identification module 14 are arranged. The components are, in particular, two button cells 17, which form the identification module's 14 own energy storage device 18. Electronics 19 of the identification module 14 are arranged, as a further component, in the receiving cavity of the housing 15. The electronics 19 comprise a printed circuit board 20, on which there are arranged, in particular, a data storage 21, a microprocessor 22 and a transponder 23, having a transmitting unit and having a receiving unit. In particular, identification data of the hand-held power tool 1 such as, for example, a serial number, appliance number, information relating to the owner, state of use or the like, are stored, or can be stored, in the data storage 21. If the transponder 23 receives an identification request, the microprocessor 22 requests the corresponding information from the data storage 21, and emits the data through the transponder 23. If, for example, information relating to the owner of the hand-held power tool 1 changes, this can be stored in the data storage 21 by means of the transponder 23 and the microprocessor 22, thereby enabling the identification of the hand-held power tool 1 to be updated. Since the identification module 14 has its own energy storage device 18, the operation of the transponder 23, or the identification of the hand-held power tool 1, is independent of the storage capacity of the energy storage module 7. As a result, in particular, it is also possible to identify the hand-held power tool 1 wirelessly by radio, if there is no energy storage module 7 arranged on the handle part 2 and the electric hand-held power tool 1 to that extent is without electric power.

Clearly, depending on the embodiment of the identification module 14, there may also be more or fewer button cells, or energy storage units, provided in the housing 15 of the identification module 14. A plurality of button ells, or energy storage units, have the advantage that the replacement of a button cell does not interrupt the operation of the identification module 14, since the identification module 14 continues to be operated by the remaining button cell or button cells, or energy storage units. It may also be provided in this case that, if a plurality of energy storage units are provided, at least one energy storage unit has a voltage level that differs from that of the rest of the energy storage units.

A wireless interface, preferably a Bluetooth interface, via which wireless communication can be effected, for example with a central unit, is preferably additionally realized or arranged on the printed circuit board 20. The Bluetooth interface in this case may be provided as an alternative or in addition to the transponder 23. Furthermore, it is preferably provided that the printed circuit board 20 has a wired interface to the electronics 9 of the electric hand-held power tool 1, for example a plug-in contact interface. Usage data of the hand-held power tool 1 such as, for example, duration of operation, fault indications or the like, can then be requested by means of this wired interface. This information is stored in the data storage 21 and if necessary, in particular upon request, transmitted together with the identification data to the transponder 23. It is provided in this case, for example, that the printed circuit board 20 has a wired interface to one or more sensors or actuators of the hand-held power tool 1 such as, for example, to a rotation-rate sensor, a temperature sensor, the electric motor and/or a brake of the electric hand-held tool 1. The advantageous design of the identification module 14 achieves the effect that communication via the electronics 9 of the hand-held power tool 1 itself is no longer necessary. Consequently, a conventional hand-held power tool 1 can also be easily expanded in its functional scope, for example by the identification module 14.

For the operation of the hand-held power tool 1, particularly in respect of energy management of the identification module 14, differing variants ensue, which are to be described in the following.

In a first variant, the identification module 14 is supplied with energy solely by the energy storage device 18, as already mentioned previously.

In a second variant, the identification module 14 is supplied with current by the energy storage module 7, in particular when the actuating switch 6 is pressed or actuated. In particular, it is provided in this case that, while the identification module 14 is supplied with current by the energy storage module 7, its energy storage device 18 is additionally charged by the current provided by the energy storage module 7.

In a third variant, the identification module 14 is supplied with current from a mains power supply lead, if the electric hand-held power tool 1 is connected to an external electricity supply by a mains power supply plug and the actuating switch 6 in particular is actuated or pressed.

If there is a voltage present on a mains power supply lead, i.e. on a current lead of the electric hand-held power tool 1, then, in a fourth variant, the identification module 14 is supplied with current via the mains power supply lead, in particular irrespective of an actuation state of the actuating switch 6.

In a fifth variant, it is provided that, if the hand-held power tool 1 is connected to an external voltage/current supply by the mains power supply lead, and if the actuating switch 6 is actuated/pressed, the identification module 14 is supplied with current via the mains power supply lead and the energy storage device 18 is charged.

In a sixth variant, it is provided that, when there is a voltage present on the mains power supply lead, the identification module 14 is supplied with current via the mains power supply lead and the energy storage device 18 is charged.

Expediently, it is provided that, when the energy storage module 7 is connected to the interface 13, the identification module 14 is supplied with current by the energy storage module 7 as long as the operating voltage of the energy storage module 7 does not fall below a predefinable voltage limit value. Undervoltage protection is thereby ensured. As soon as the voltage falls below the voltage limit value, the current supply of the identification module 14 switches over to a current supply by its own energy storage device 18.

Particularly preferably, the energy storage device 18 is realized in such a manner that it can be charged inductively, with resultant possibilities for ease of charging by means of external charging devices.

The housing 15 is preferably closed by a cover element, such that the electrical components of the identification module 14 in the housing 15 are reliably protected against dust or water. In particular, it may be provided in this case that the receiving cavity and the electrical components present therein are encapsulated by an electric non-conductive encapsulation compound. In the event of a fault, or for the purpose of servicing, the identification module 14 can be replaced in its entirely through an opening in at least one of the housing half-shells of the housing 12 of the hand-held power tool 1.

Alternatively, it is conceivable to configure the housing 15 in such a manner that the energy storage device 18 is arranged in a replaceable manner, i.e. not encapsulated in the housing 15. It is thus provided, for example, that a displaceable closure element such as, for example, a cover or the like on the housing 15, is assigned to the energy storage device 18, to enable the energy storage device 18 to be removed from the housing 15 if required. For this purpose, the housing 15 has a corresponding energy storage device receiver, in which the energy storage device can be arranged and protected by the closure element against external influences.

Alternatively or additionally, it is provided that the housing 12 of the hand-held power tool 1 likewise has a displaceable closure element for uncovering or closing an energy storage device receiver for the energy storage device 18, such that the energy storage device can be replaced directly, without the necessity of demounting the housing 12 of the hand-held power tool 1. Thus, the housing 12, for example in the region of the identification module 14, or in the region of the recess 16, has a pivotable or displaceable cover 24 for uncovering and closing the recess 16 and/or the identification module 14 as a whole. This makes it possible to achieve easy replacement of the energy storage device or of the entire identification module 14.

Preferably, the housing 15 of the identification module 14 is fixed in a form-fitting manner in the housing 12, in particular by ribs on the inside of the housing half-shells of the housing 12. The arrangement between the electronics 9 and the interface 13 achieves the effect that the identification module 14 can be used in all hand-held power tools 1 that have the same structure with respect to the interface 13.

While, in the present exemplary embodiment, it is assumed that the components of the identification module 14 are all arranged in or on the housing 15, it is conceivable, according to another exemplary embodiment (not represented here), for some of the components also to be placed so as to be locally separated from one another, for example on the housing 12 of the hand-held power tool 1. Adaptation to the structural space of the respective hand-held power tool 1 can thereby be easily achieved.

The Bluetooth interface may also be used, for example, to effect communication with a user's mobile telephone or mobile device, in order to request particular data or to perform setting of the hand-held power tool 1. It is also conceivable for communication with other hand-held power tools (tool-to-tool communication) to be effected via the wireless interface.

The invention claimed is:

1. A hand-held power tool comprising:
 a housing defining a receiving recess, a replacement opening of the receiving recess, and a cover that selectively closes and uncovers the replacement opening;
 an identification module in the receiving recess of the housing, the identification module including an energy storage device assigned only to the identification module and a transponder having:
  at least one data storage device configured to store identification data; and
  a radio module operable to transmit the identification data; and
 at least one damping element configured to hold the identification module in the receiving recess,
 wherein the at least one damping element is elastically deformable,
 wherein the energy storage device includes a first energy storage unit and a second energy storage unit.

2. The hand-held power tool as claimed in claim 1, wherein the energy storage device is configured so as to be replaceable.

3. The hand-held power tool as claimed in claim 1, further comprising:
 electronics that are wired or wirelessly coupled to the identification module.

4. The hand-held power tool as claimed in claim 1, further comprising:
 an energy supply,
 wherein the energy storage device is rechargeable, and is either electrically connected or electrically connectable to the energy supply of the hand-held power tool.

5. The hand-held power tool as claimed in claim 1, wherein the identification module further includes a module housing.

6. The hand-held power tool as claimed in claim 1, wherein the hand-held power tool is an electric hand-held power tool.

7. A hand-held power tool, comprising:
 a housing defining a receiving recess, a replacement opening of the receiving recess, and a cover that selectively closes and uncovers the replacement opening;
 an identification module in the receiving recess of the housing, the identification module including an energy storage device assigned only to the identification module and a transponder having:
  at least one data storage device configured to store identification data; and
  a radio module operable to transmit the identification data; and
 at least one damping element configured to hold the identification module in the receiving recess,
 wherein the at least one damping element is elastically deformable,
 wherein the energy storage device includes a first energy storage unit and a second energy storage unit,
 wherein replacement of the first energy storage unit does not interrupt operation of the identification module, since the identification module continues to be operated by the second energy storage unit, and
 wherein replacement of the second energy storage unit does not interrupt operation of the identification module, since the identification module continues to be operated by the first energy storage unit.

8. The hand-held power tool as claimed in claim 7, further comprising:
 electronics that are wired or wirelessly coupled to the identification module.

9. The hand-held power tool as claimed in claim 7, further comprising:
 an energy supply,
 wherein the energy storage device is rechargeable, and is either electrically connected or electrically connectable to the energy supply of the hand-held power tool.

10. The hand-held power tool as claimed in claim 7, wherein the identification module further includes a module housing.

11. The hand-held power tool as claimed in claim 7, wherein the hand-held power tool is an electric hand-held power tool.

* * * * *